United States Patent [19]
Vives et al.

[11] Patent Number: 5,114,772
[45] Date of Patent: May 19, 1992

[54] PROTECTIVE MATERIAL HAVING A MULTILAYER CERAMIC STRUCTURE

[75] Inventors: Michel Vives, Eysines; Pierre Taveau, Le Bouscat; Jacques Etienne, Eysines; Yves Remillieux, Sur Yvette; Lucien Charbonnel, Maurice Montcouronne, all of France

[73] Assignee: Societe Europeenne De Propulsion, Suresnes, France

[21] Appl. No.: 746,213

[22] Filed: Aug. 15, 1991

Related U.S. Application Data

[63] Continuation of Ser. No. 451,440, Dec. 15, 1989, abandoned.

[30] Foreign Application Priority Data

Dec. 19, 1988 [FR] France .................. 88 16753

[51] Int. Cl.$^5$ .................. F41H 5/04; B32B 3/10; B32B 3/14
[52] U.S. Cl. .................. 428/49; 428/304.4; 428/284; 89/36.02; 109/80
[58] Field of Search .............. 428/49, 67, 911, 304.4, 428/284; 89/36.02; 109/80.84

[56] References Cited

U.S. PATENT DOCUMENTS

| | | | |
|---|---|---|---|
| 3,828,699 | 8/1974 | Bowen | 109/80 |
| 4,030,427 | 6/1977 | Goldstein | 428/911 |
| 4,836,084 | 6/1989 | Vogelesang et al. | 89/36.02 |

FOREIGN PATENT DOCUMENTS

| | | |
|---|---|---|
| 0244993 | 11/1987 | European Pat. Off. |
| 0287918 | 10/1988 | European Pat. Off. |
| 2952109 | 5/1987 | Fed. Rep. of Germany |

*Primary Examiner*—Alexander S. Thomas
*Attorney, Agent, or Firm*—Weingarten, Schurgin, Gagnebin & Hayes

[57] ABSTRACT

Sintered ceramic elements are associated to at least one composite material layer having a fibrous reinforcement arrangement and a ceramic matrix located behind the sintered ceramic elements.

7 Claims, 1 Drawing Sheet

1

PROTECTIVE MATERIAL HAVING A MULTILAYER CERAMIC STRUCTURE

This application is a continuation of application Ser. No. 07/451,440, filed Dec. 15, 1989 is now abandoned.

BACKGROUND OF THE INVENTION

1. Field of the Invention

The present invention relates to a protective material having a multilayer ceramic structure. The field of application particularly concerns materials for the protection of machines or personnel against projectiles.

2. Background of the Invention.

The use of ceramics in protective materials is well established. These materials make it possible to achieve better ballistic performance from projectiles at speeds in excess of 500 m/s. This is due to the fact that sintered ceramics, such as alumina, boron carbide and silicon carbide, have virtually zero porosity, as well as the hardness and compression resistance properties needed to break up the core of a projectile.

However, these sintered ceramics are very fragile to shocks, with the result that a sintered ceramic plate becomes broken right after the first projectile impact To limit the destructive effects of the impact, protective materials are generally formed from sintered ceramic tiles or plates that are adhered to each other and affixed to a base arrangement. The latter is usually made from fabric layers e.g. made of aramide fibers, such as "Kevlar" fibers that form a penetration resistant arrangement which deforms to absorb the residual kinetic energy of the projectile broken by the ceramic frontal layer.

SUMMARY OF THE INVENTION

The aim of the present invention is to provide a multilayer structure ceramic protective material having improved properties in comparison with known materials.

This aim is achieved with a protective material comprising sintered ceramic elements which, according to the invention, are associated with at least one layer of composite material having a fibrous reinforcement arrangement and a ceramic matrix and placed at least partially behind said sintered ceramic elements.

The ceramic matrix composite (CMC) materials comprise a fibrous reinforcement structure densified by a ceramic matrix. The reinforcement arrangement is formed e.g. of fabric layers made of refractory fibers such as carbon or ceramic fibers. The ceramic matrix is infiltrated within the porous reinforcement texture. The matrix is produced by chemical vapor infiltration, or by liquid impregnation using a precursor of the ceramic material used for the matrix, followed by a treatment for transforming the precursor into a ceramic. The processes for the manufacture of CMC materials having a carbide matrix (e.g. silicon carbide) or an oxide matrix (e.g. alumina or zirconium) have already been described in patents FR 77 26 979 (publication No. 2 401 888) and EP 0 085 601, for instance.

Like sintered ceramics, CMC materials have hardness and compression resistance properties, with a residual porosity generally of the order of 10 to 15% by volume, that also makes them capable of breaking the core of a projectile traveling in excess of 500 m/s. Compared with sintered ceramics, CMC materials have the advantages: of resisting several impacts without being totally destroyed, being adapted to the construction of large items, withstanding a structural application at temperatures above 400° C., and having a lower density (2.5 for a SiC-SiC composite material against 3.6 for sintered alumina).

However, CMC materials at present have the drawback of being more difficult to densify when the thickness begins to exceed 10 mm, which could be insufficient to absorb the kinetic energy of a projectile. The combination of a CMC material and sintered ceramic elements in a protective material according to the invention solves the above problem.

Furthermore, CMC materials tend to deform upon impact by a collapse of their porosity and a bending of the fibers in the reinforcement arrangement, so absorbing the kinetic energy of the projectile with a very small deformation at the rear face of the protective material. This is a significant advantage in comparison with known materials comprising layers of fabric at the rear of the front ceramic layer, since in these known materials that impact from a projectile produces a relatively large deformation of the rear face which in some circumstances can seriously diminish the protective effect.

BRIEF DESCRIPTION OF THE DRAWINGS

Various embodiments of a protective material according to the invention shall be described below as a non-limiting example with reference to the appended drawings in which.

DETAILED DESCRIPTION OF THE PREFERRED EMBODIMENTS

Figure 1:
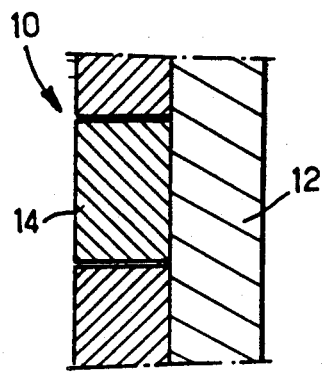
FIG. 1 is a cross sectional view of a protective material according to the invention and comprising sintered ceramic elements adhered to the front face of a CMC material layer.

The protective material 10 shown in FIG. 1 comprises a rear layer 12 made of CMC and a front layer formed by a juxtaposition of plates 14 made of sintered ceramic and affixed to the front face of the layer 12 This layer 12 can e.g. be a carbon-ceramic type composite material having a carbon fiber reinforcement arrangement and a ceramic matrix. Preferably, the carbon fiber arrangement is comprised of a pile of fabric plies laid parallel to the faces of layer 12. The infiltration of the ceramic material of the matrix within the porous reinforcement arrangement is achieved by chemical vapor infiltration with the fabric plies held in position by some form of tooling. The ceramic material for the matrix is e g silicon carbide (SiC). A process for chemical vapor infiltration of SiC is described in French patent FR 77

26 979 cited above. The infiltration is continued until a residual porosity of preferably less than 15% is attained.

Alternatively, the layer 12 can be a ceramic-ceramic type composite, e.g. of the SiC-SiC type. Here, the reinforcement arrangement is formed by layers of a SiC fabric and is densified by chemical vapor infiltration of SiC.

As a further alternative, ceramics other than silicon carbide, e.g. alumina, zirconium or boron carbide may be used to form the matrix for the carbon-ceramic or ceramic-ceramic composite materials, or to form the fibers for the ceramic-ceramic composite material reinforcement.

The sintered ceramic plates 14 are e.g. made of silicon carbide, alumina or boron nitride They are arranged side-by-side and fixed to the front face of the CMC material layer 12 by adhesion. The adhesion of the SiC plates on a C-SiC or SiC-SiC type composite material layer is obtained e.g. by use of epoxy type resins. Preferably, one and the same ceramic is used to form the CMC material matrix of layer 12 and the plates 14.

Shaped protective material items are produced by adhesion of the sintered ceramic plates 14 on a rear face 12 having the desired shape. This is achieved by producing layer 12 by densification of a shaped reinforcement texture.

According to one intended application, the assembly comprised of the rear CMC material face 12 and the sintered ceramic front plate 14 can be completed at either the front or rear face by coverings serving to provide various functions such as: radar and infra-red discretion, camouflage (paintwork on front face), sealing, electrical conductivity, and an anti-shrapnel protection. If required, the protective material can be mounted on a structure to be protected e.g by means of a composite covering surrounding all or a part of the protective material by forming mounting elements, arranged laterally. Such a coating could also provide an anti-shrapnel function.

The behaviour of the protective material shown in FIG. 1 upon impact by a projectile is as follows. The sintered ceramic plates 14 break up the core of the projectile The residual kinetic energy of the latter is absorbed by the CMC material layer 12 by local collapse of the porosity and flexing of the reinforcement texture fibers, without inducing any substantial deformation at the rear face.

Although the case of a two-layer ceramic protective material was considered above, the actual number of layers can be increased, e.g. by superposition of several CMC material layers at the rear of the plates 14, or by arranging the latter in a sandwich structure between two CMC layers.

Figure 2:
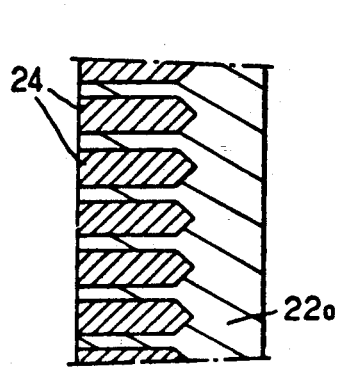
FIGS. 2 and 3 illustrate an embodiment of the protective material according to the invention, having a different structure and comprising splinters implanted into a sintered ceramic.
Figure 3:
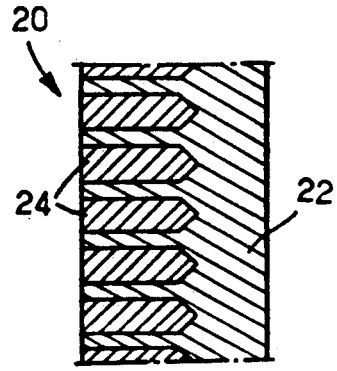

FIGS. 2 and 3 illustrate another embodiment of a protective material 20 according to the invention in which the sintered ceramic elements are in the form of splinters 24 inserted in the front part of a CMC material layer. After the fibrous reinforcement arrangement 22a of the layer 22 has been made, the splinters 24 are implanted into the dry arrangement 22a from the front face (FIG. 2). Once the splinters 24 have been placed, the assembly is densified by infiltration of the ceramic material constituting the matrix of the CMC material layer 22, which looks the splinters 24 therein (FIG. 3).

Figure 4:
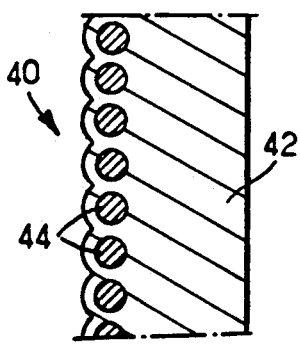
FIGS. 4 and 5 are cross sectional views illustrating other embodiments of a protective material according to the invention and comprising sintered ceramic elements inserted in the front face of a CMC material layer.
Figure 5:
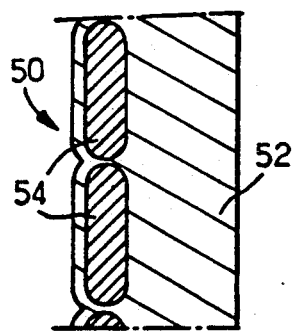

FIGS. 4 and 5 show other protective materials 40, 50 according to the invention, in which the sintered ceramic elements consist of inserts in the form of balls 44 or small plates 54 inserted side-by-side in the CMC material layer 42, 52 respectively, and close to the front face of the latter. The balls 44 may alternatively be replaced by cylindrical rods arranged-side-by side, parallel to the front face of the material. These inserts are placed within the reinforcement structure prior to densification by chemical vapor infiltration of the ceramic material of the matrix. The inserts are put into place inside pockets produced when weaving the reinforcement arrangement.

Figure 6:
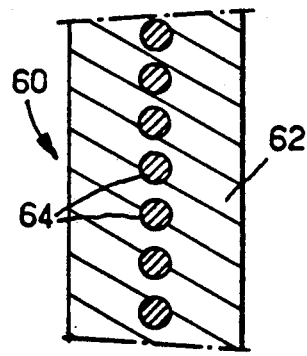
FIGS. 6 to 8 are cross sectional views illustrating yet other embodiments of a protective material according to the invention and comprising sintered ceramic elements inserted inside a CMC material layer.
Figure 7:
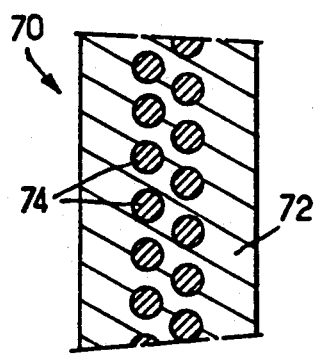
Figure 8:
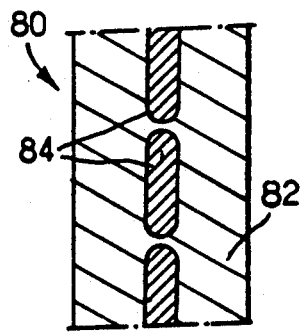

FIGS. 6, 7 and 8 illustrate yet other protective materials 60, 70 and 80 according to the invention, in which the inserts 64, 74, 84, in the form of balls or cylinders (FIGS. 6, 7) or in the form of plates (FIG. 8) are placed side-by-side in one layer (FIGS. 6, 8) or several layers (FIG. 7) in the central portion of the CMC material layer 62, 72 and 82 between the front and rear faces thereof. As explained above, the inserts 64, 74 and 84 are contained within pockets formed during the weaving of the CMC material layer reinforcement arrangement, prior to densification of the latter.

Figure 9:
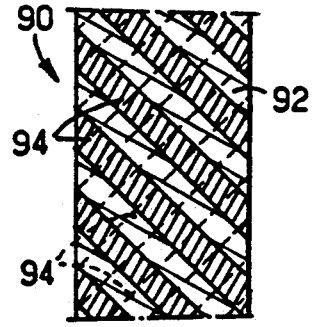
FIG. 9 is a cross sectional view illustrating an embodiment of a protective material according to the invention and comprising sintered ceramic elements disposed throughout the thickness of a CMC material layer.

Finally, FIG. 9 shows a protective material according to the invention, in which the sintered ceramic elements are formed by splinters 94 running across the entire thickness of the CMC material layer from the front face to the rear face. The splinters 94 are arranged in an inclined position relative to the direction normal to the faces of the layer 92. Preferably, the splinters are arranged along two different directions that are mutually symmetrical with respect to the above-mentioned normal position. The splinters 94 are implanted in the fibrous reinforcement arrangement of the CMC layer prior to infiltration of the matrix-forming material.

Preferably, in the different embodiments illustrated in FIG. 2 to 9, one and the same ceramic is used for the CMC material layer matrix and the inserts. All of the above described embodiments share a characteristic of the invention which is that between the front face of the protective material exposed to the impact of a projectile and the rear face, there is arranged at least one layer of sintered ceramic elements, and directly or indirectly behind the latter there is at least one CMC material layer.

What is claimed is:

1. A ceramic protective material comprising:
a layer of composite material comprising a fibrous reinforcement arrangement densified by a ceramic matrix and having a residual porosity of approximately 10-15% by volume, and
a plurality of sintered ceramic elements arranged at a front face of said layer of composite material,
wherein said plurality of sintered ceramic elements bread up the core of a projectile upon impingement and said composite material absorbs residual kinetic energy of said projectile upon impingement.

2. A ceramic protective material as claimed in claim 1, wherein said fibrous reinforcement comprises fabric piles arranged parallel to said front face of said layer of composite material.

3. A ceramic protective material as claimed in claim 1, wherein said plurality of sintered ceramic elements comprises plates arranged side-by-side and adhered to said front face of said layer of composite material.

4. A ceramic protective material comprising:
a layer of composite material comprising a fibrous reinforcement arrangement densified by a ceramic matrix and having a residual porosity, and
a plurality of sintered ceramic elements each comprising elements comprising a sintered fiber reinforcement arrangement and a ceramic matrix and arranged at a front face of said layer of composite material, wherein said plurality of sintered ceramic elements break up the core of a projectile upon impingement and said composite material absorbs residual kinetic energy of said projectile upon impingement.

5. A ceramic protective material as claimed in claim 4, wherein said fibrous reinforcement comprises fabric piles arranged parallel to said front face of said layer of composite material.

6. A ceramic protective material as claimed in claim 4, wherein said plurality of sintered ceramic elements comprises plates arranged side-by-side and adhered to said front face of said layer of composite material.

7. A ceramic protective material as claimed in claim 4 wherein said residual porosity is in a range of approximately 10-15% by volume.

* * * * *